United States Patent [19]

Hayashi

[11] Patent Number: 4,555,771
[45] Date of Patent: Nov. 26, 1985

[54] DATA PROCESSING SYSTEM FOR DATA BASE MANAGEMENT OF MATRIX TYPE DATA

[75] Inventor: Katsumi Hayashi, Ichikawa, Japan
[73] Assignee: Fujitsu Limited, Kawasaki, Japan
[21] Appl. No.: 362,449
[22] Filed: Mar. 26, 1982

Related U.S. Application Data

[63] Continuation-in-part of Ser. No. 328,935, Dec. 9, 1981, abandoned, which is a continuation of Ser. No. 69,762, Aug. 27, 1979, abandoned.

[51] Int. Cl.⁴ .............................................. G06F 5/00
[52] U.S. Cl. .................................... 364/900; 364/731
[58] Field of Search ................. 364/200, 900, 300, 731

[56] References Cited

U.S. PATENT DOCUMENTS 3,461,433  8/1969  Emerson ........................... 364/200
4,025,901  5/1977  Bauchman et al. ................ 364/200
4,042,914  8/1977  Bauchman et al. ................ 364/300

OTHER PUBLICATIONS

Fry et al., "Evolution of Data Base Management Systems", Computer Surveys, vol. 1, Mar. 1976, pp. 1–42.

Primary Examiner—Eddie P. Chan
Assistant Examiner—Melinda Thaler
Attorney, Agent, or Firm—Daniel Jay Tick

[57] ABSTRACT

A data base management system of a data processing system handles a hierarchical structure model. Matrix type data, considered as having different hierarchical structure in accordance with the application, is effectively handled by storing in the form of one-dimensional data in a file device and making up the desired hierarchical structure when used. This is accomplished by providing first order address information and designating a scheme code which defines the desired hierarchical structure when the data is utilized by a user.

1 Claim, 21 Drawing Figures

FIG.5
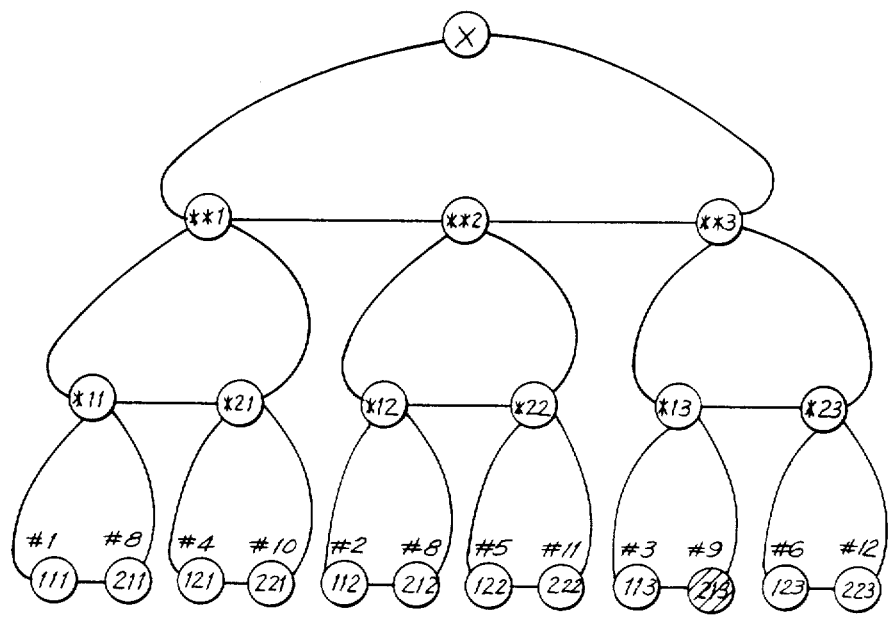
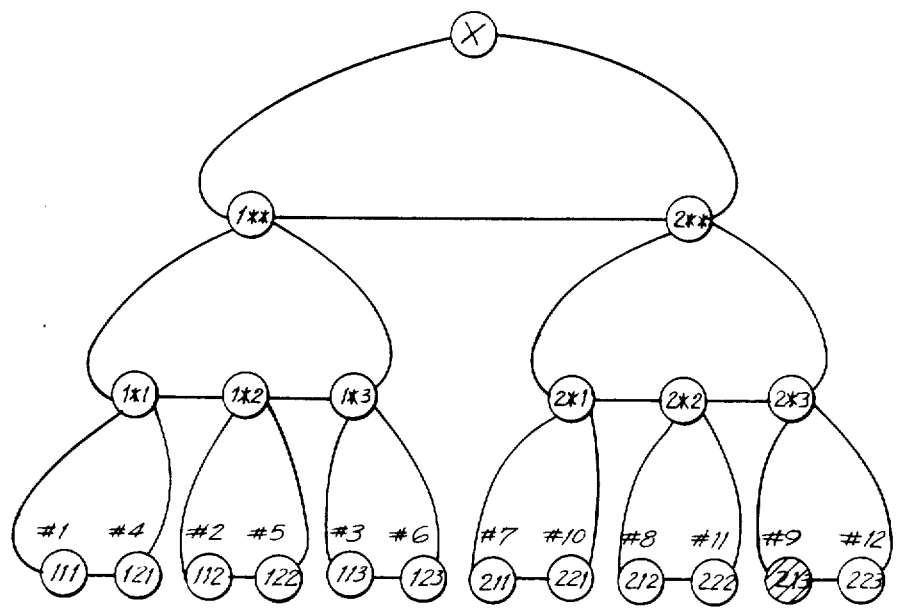
FIG.6

FIG. 8C
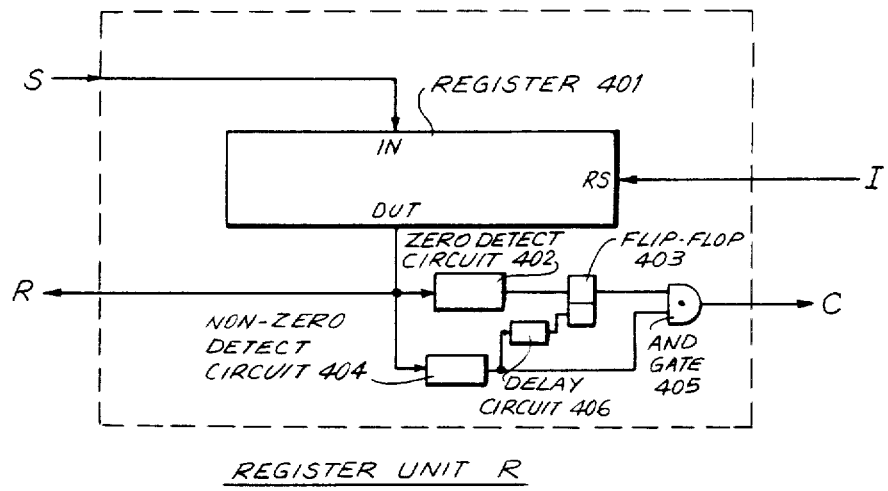
REGISTER UNIT R
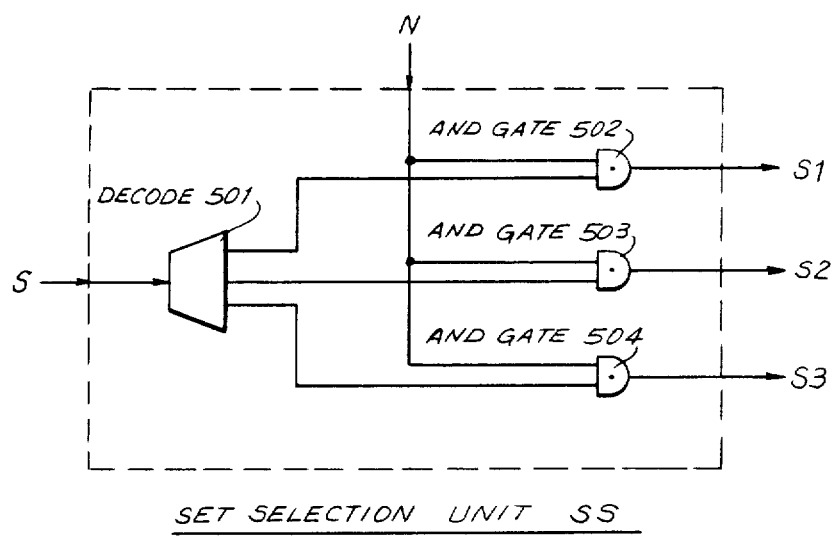
SET SELECTION UNIT SS
FIG. 8D

LINEAR EXPANDER UNIT LE

COMPOSE MATRIX UNIT CM

DATA PROCESSING SYSTEM FOR DATA BASE MANAGEMENT OF MATRIX TYPE DATA

BACKGROUND OF THE INVENTION

1. Field of the Invention

This application is a continuation-in-part of pending patent application Ser. No. 328,935, filed Dec. 9, 1981, for Data Processing System Having a Data Base Management System, which application, in turn, is a continuation of application Ser. No. 069,762, filed Aug. 27, 1979, for Data Processing System Having a Data Base Management System, both now abandoned.

The present invention relates to a data processing system. More particularly, the invention relates to a data processing system having a data base, in which system matrix type data is prepared for a common data base and a plurality of programs utilize the contents of the common data base in accordance with respective processings.

Herein, "matrix type data" means a group of data specified by a plurality of coordinates. In three-dimensional matrix type data, for example, one data may be specified by respectively designating three coordinates a1, a2 and a3.

2. Description of the Prior Art

In a known data base management system, data structure is considered to have a hierarchical model. However, if the data has a matrix type data structure, the data cannot always be handled effectively. In known systems, data having a matrix type data structure is handled by two methods. In one method, a "record", or minimum unit of data is designated directly by an n-dimensional coordinate a1, a2, ... an for an n-dimensional matrix. This method has sufficient merit that data can be handled with the same convenience, even if attention is paid to any of the aforementioned coordinates. However, this method cannot be used in a general management system, because it is not suited to a model of hierarchical structure widely used in the general data base.

In another method, the n-dimensional matrix type data is handled by being analyzed into specific hierarchical structure data which has n hierarchies. This method has sufficient merit that data can be processed directly as the data of the ordinary hierarchical structure model, via the general data base management system.

Essentially, the matrix type data has the advantage that it can be handled equally, even when processing is undertaken centering on any attribute or any coordinate. However, the aforementioned hierarchical structure data is inconvenient for application centering on a different attribute. In order to use the matrix type data with the same convenience, although centering on a desired attribute, all hierarchical structure data must be previously defined by paying attention to a respective attribute.

The principal object of the invention is to provide a data processing system for a conventional data management system, utilizing a hierarchical structure to effectively handle matrix type data.

An object of the invention is to provide a data processing system for a conventional data management system to handle the same matrix type data for different applications with the same convenience.

Another object of the invention is to provide a data processing system for virtually converting matrix type data to a desired hierarchical structure data.

BRIEF SUMMARY OF THE INVENTION

In accordance with the invention, a data processing system for data base management, comprises a file device for storing n-dimensional matrix type data on the basis of one-dimensional address information, an n-coordinate axis size storage for respectively storing the maximum value of each coordinate axis of an n-dimensional coordinate, a scheme code storage for storing a code designating a desired scheme having n hierarchies, n address storages, each corresponding to a hierarchy of a specific n-hierarchical scheme and each for storing an address indicating an ordinal number in a specific set in the corresponding hierarchy, n being an integer at least equal to 2, a designating device connected to the address storages for designating a desired one of the address storages and updating the contents thereof, and a calculator connected to the n-coordinate axis size storage, the scheme code storage, the address storages and the designating device for calculating the one-dimensional address from the contents of the address storages, the contents of the scheme code storage and the contents of the n-coordinate axis size storage.

The one-dimensional address information has a value equal to $$(a1-1)A2A3 \ldots An + (a2-1)A3A4 \ldots An + \ldots + (a(n-1)-1)An + an,$$

wherein a1, a2 ... an is the n-dimensional coordinate and A1, A2 ... An is the coordinate axis size. The calculator includes a converter connected to the scheme code storage, the address storages and the designating device for providing correspondence between the contents of the designated one of the address storages and the n-dimensional coordinate in accordance with the contents of the scheme code storage, the converter having an output, and a linear expander connected to the n-coordinate axis size storage, the designating device and the converter for executing operation of the one-dimensional address information value in accordance with the output of the converter and the contents of the n-coordinate axis size storage.

BRIEF DESCRIPTION OF THE DRAWINGS

In order that the invention may be readily carried into effect, it will now be described with reference to the accompanying drawings, wherein:

FIGS. 4, 5 and 6 illustrate a concept of three-dimensional matrix data considered to be different three-hierarchical structures;

FIG. 8C is a block diagram of an embodiment of a register unit R;

FIG. 8D is a block diagram of an embodiment of a set selection unit SS;

DETAILED DESCRIPTION OF THE PREFERRED EMBODIMENT OF THE INVENTION

In order to describe the data processing system of the invention, the sales of a certain company are considered as a concrete example of matrix type data. If such data is three-dimensional data, the axis a1 means, for example, the item, the axis a2 means the name of the customer and the axis a3 means the year of delivery. The size of the axes is considered to be 2 for a1, 2 for a2 and 3 for a3. More particularly, this data includes two types of items, two places of customers and deliveries over a period of three years. Such data is used, for example, in the following modes. (i) It is desired to know variations in the amount of sales, in each year, for a specified customer, (ii) it is desired to know the amount of sales of each customer in the specified year, and (iii) it is desired to know variations in the amount of sales of a specified item, each year.

Figure 1:
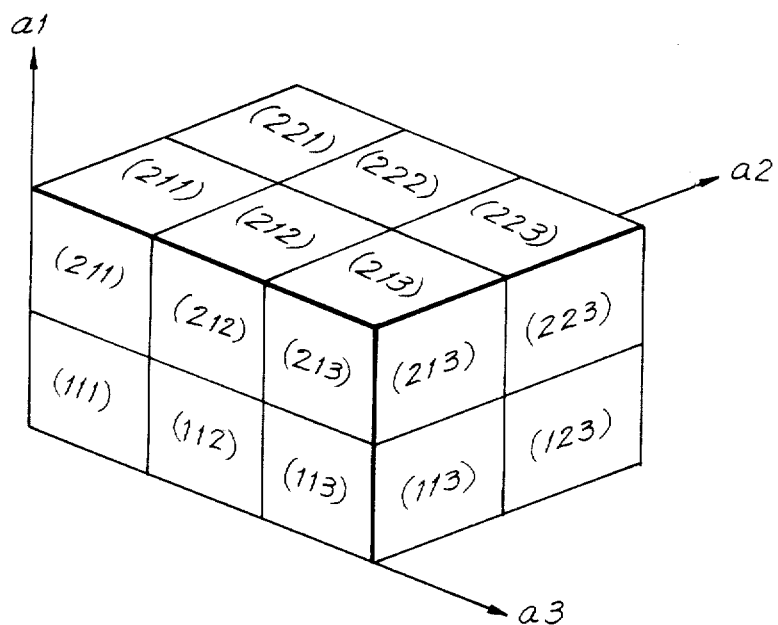
FIG. 1 illustrates a concept of three-dimensional matrix data.

FIG. 1 illustrates a concept of three-dimensional matrix data, wherein a1, a2 and a3 are coordinate axes. Each record data is labelled with a three-dimensional coordinate value such as (1, 1, 1), (1, 1, 2) . . . (2, 2, 3). For such matrix data, it is convenient if access to the specific record data is direct and at random by designating its coordinate value.

However, the conventional data base management system has been developed originally for handling hierarchical structure data, and it can handle matrix type data only by considering it as a certain hierarchically structured data. Furthermore, in order to make it convenient in any case of (i), (ii), (iii) . . . , all of the possible hierarchically structured data must be prepared initially. The maximum number of possible hierarchical structures in $n! = n \times (n-1) \times (n-2) \times \ldots \times 3 \times 2 \times 1$ for n-dimensional matrix type data.

Figure 2:
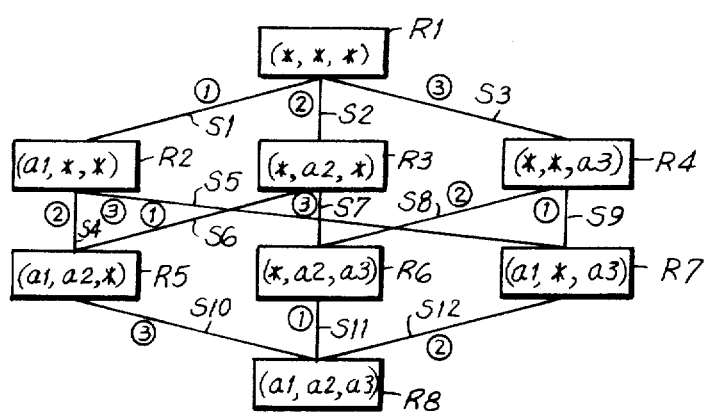
FIG. 2 illustrates the correspondence between three-dimensional matrix data and possible hierarchical structures.

FIG. 2 shows all the possible hierarchical structures for a concrete example of three-dimensional data. In FIG. 2, each of R1 to R8 is a record or group of records and each of S1 to S12 is a set or group of sets. Herein, "record" means a minimum unit of data, and "set" means a set of one record and other records linked thereto. The one record is called an "owner record", and the records linked to the owner record are called "member records". The records in the record groups R2 to R7 are called "virtual" records. Virtual records are not intrinsically necessary, but are provided for matrix data to be analyzed to hierarchical structure data.

The record R1 of FIG. 2 stores a name representing the data of FIG. 1 as a whole and the linkage address to the lowerranked record groups R2, R3 and R4. The record group R2 is composed of two records (1, *, *) and (2, *, *), and each record stores a typical name of the record groups involved therewith and the linkage address thereof. In accordance with the example, the typical name of the record (1, *, *) is a product name, while that of the record (2, *, *) is another product name, because the coordinate axis a1 is the sales item. This rule is also adapted to the other record groups R3 and R4. However, the record group R4 includes three records. Furthermore, the record group R5 includes a total of eight records. These records are (1, 1, *) and (1, 2, *) involved with the record (1, *, *) of the record group R2, (2, 1, *) and (2, 2, *) involved with the record (2, *, *) of the record group R2, (1, 1, *) and (2, 1, *) involved with the record (*, 1, *) of the record group R3, and (1, 2, *) and (2, 2, *) involved with the record (*, 2, *) of the record group R3. The first four and the last four of these eight records are overlapped, but they must exist individually, because the linkage methods are different. Thus, for example, the former record (1, 1, *) is linked to the record (1, *, *) in the record group R2 and is also linked to the record (1, 2, *). On the other hand, the latter record (1, 1, *) is linked to the record (*, 1, *) in the record group R3 and is also linked to the record (2, 1, *).

This rule is also adapted to the other record groups R6 and R7. However, each of the record groups R6 and R7 includes 12 records. Each of these records stores a name representing the lower-ranked record group involved therewith and the linkage address thereof. Furthermore, the record group R8 includes a total of 36 records. 12 of the records are linked to eight records in the record group R5, 12 of the records are linked to 12 records in the record group R6, and 12 of the records are linked to 12 records in the record group R7.

Thus, for example, three records (1, 1, 1), (1, 1, 2) and (1, 1, 3) are linked to the record (1, 1, *) in the record group R5 and three records are required for all of the eight records in the record group R5, in the same manner. However, eight records in the record group R5 are composed of four overlapped records, and since the overlapped records of R5 may be linked to the same records in R8, a total of 12 records (3×4) is required. Similarly, 12 records (2×6) must be linked to each of the other record groups R6 and R7, and these cannot be used in common. Therefore, a total of 36 records is required. Each of these 36 records stores its name, and data. In the example, this data is sales. Each record in the record groups R2 to R8 also stores the link address to the adjacent member record involved with the same owner record. The total number of records is 75, indicated as follows.

R2=2
R3=2
R4=3
$R5 = R2 \times 2 + R3 \times 2 = 8$
$R6 = R3 \times 3 + R4 \times 2 = 12$
$R7 = R2 \times 3 + R4 \times 2 = 12$
$R8 = \frac{1}{3}(R5 \times 3 + R6 \times 2 + R7 \times 2) = 36$ As explained hereinbefore, the conventional method requires many virtual record groups R2 to R7 which have only information representing the relationship between the records in the record group R8, while the number of intrinsically necessary records is only 2×2×3=12.

Figure 4:
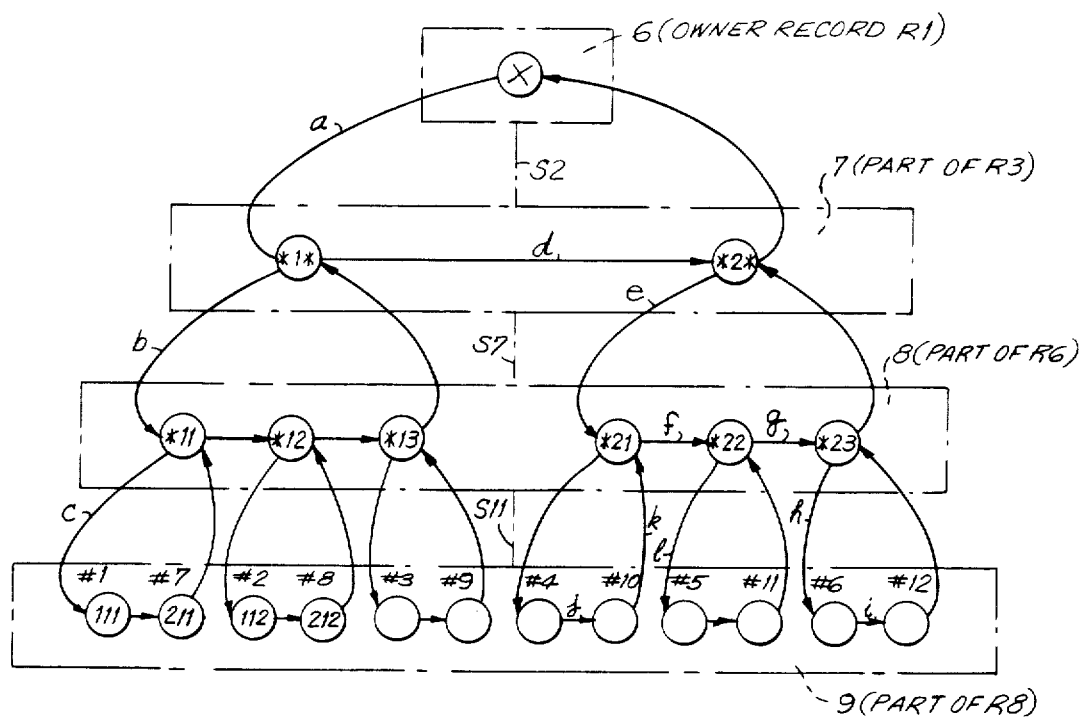

The conventional data base management system on which the invention is based is designed to use the data base in the hierarchical network structure shown in FIGS. 4, 5 and 6. In such data base, each record includes address to the other associated records. The desired record may be found in such data base through a troublesome process such as, for example, sequential reading, attempted link by link. If the desired data record cannot be found, the next record being linked thereto must be read out. In other words, random access is impossible.

Figure 3:
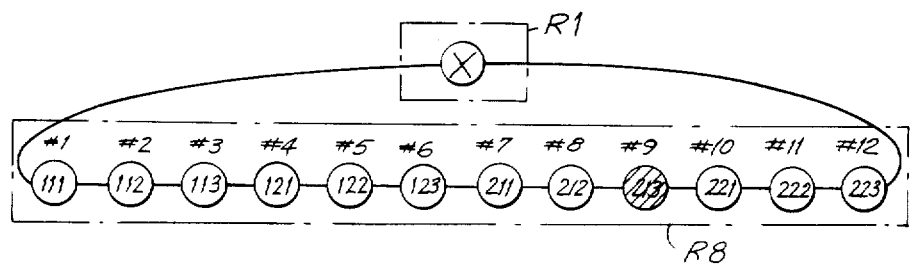
FIG. 3 illustrates three-dimensional matrix data which is stored in a file device by being given a one-dimensional address, that is, an ordinal number from 1 to 12.

If the data structure, which is not hierarchically structured, as shown in FIG. 3, is handled directly, although it may be handled by the data base management system, an access trial of 12 times is required for access to the #12 record (223), considering only a counterclockwise linkage direction. Only one trial is necessary for access to the #1 record (111). The average required number of access trials is thus 6.5 times.

On the other hand, when the hierarchical structure is provided as indicated in FIG. 4, the minimum number of access trials is three times (a→b→c), during access of the #1 record, and the maximum number of trials is seven times (a→d→e→f→g→h→i), during access of the #12 record. The average number of access trials is thus five times.

In FIG. 4, 6 is the owner record R1, 7 corresponds to part of R3, 8 corresponds to part of R6 and 9 corresponds to part of R8. The record (*, 1, *), for example, has linkage addresses to (*, 1, 1) and to (*, 2, *). The link b or d is selected according to the record to which the access should be made.

The foregoing number of trials is considered under the supposition that the trial always starts from the owner record R1. Actually, however, access is often carried out continuously to the plurality of related records. When such relation is, for example, based on a2, the structure shown in FIG. 4 is more desirable. Thus, if access is continuously to the desired two records belonging to (*, 2, *), for example, the minimum number of trials is once (j), during access to the #10 record, and the maximum number of trials is six times (j→k→f→g→h→i), during access to the #12 record. Thus, the average number of trials is 3.5 times. In this case, access to the second record should be started from the #4 record.

As hereinbefore described, access efficiency is generally improved by use of the hierarchical structure and the storage of the headline records, or virtual records, in the data base as real records. However, a specific hierarchical structure data has a high access efficiency in a specific relation, which is the coordinate axis in the present invention, but is not access efficient in the other relation. Thus, in FIG. 4, for example, when access is continuous to the desired two records belonging to (1, *, *), the number of trials required for access to the second record is a minimum of four times, when the first record is #1 and the second record is #2, or a maximum of ten times, when the first record is #1 and the second record is #6. The average number of access trials is seven times.

The virtual set shown in FIG. 4 is convenient for application in the case (i) hereinbefore mentioned. More particularly, the volume of sales of each year (a3) of a specific customer (a2) may be obtained by summation of the read out data of the #1 and #7 records via the virtual records (*, 1, *) and (*, 1, 1) shown, a summation of the read out data of the records #2 and #8 via the virtual record (*, 1, 2), and then a summation of the read out data of the records #3 and #9 via the virtual record (*, 1, 3).

It is apparent that the structures shown in FIGS. 5 and 6 are very convenient when applied in the cases (ii) and (iii) hereinbefore mentioned. The structure shown in FIG. 6 is desirable for continuous access to the records by the same value of a1. The minimum number of trials required for access to the second record in FIG. 6 is once and the maximum number of access trials is six times, when the first record is #1 and the second record is #6. The average number of access trials is thus 3.5 times.

If the data of the different structures is prepared in accordance with the purpose, a large number of records must be prepared, as explained with regard to FIG. 2. In other words, all of the records and the virtual records in FIGS. 4, 5 and 6 must be prepared in the actual memory medium.

Figure 7A:
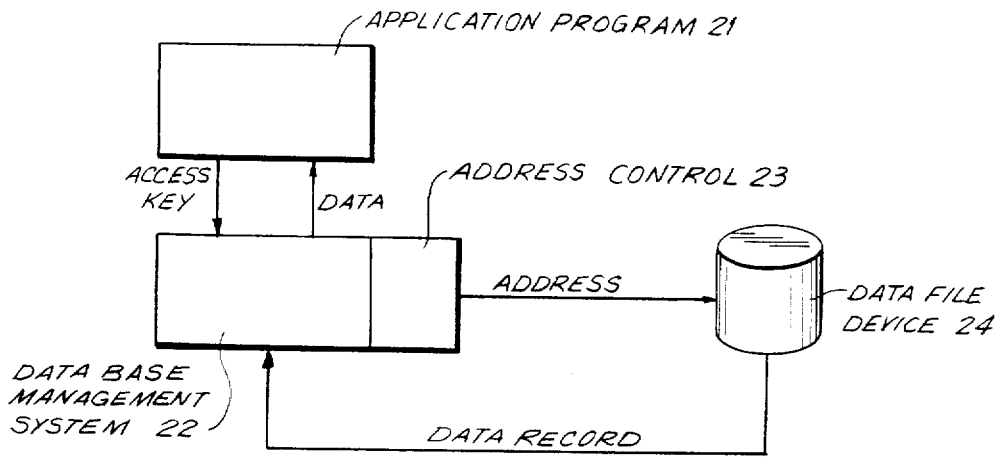
FIG. 7A is a block diagram of a conventional data base system.

FIG. 7A shows the concept of a conventional data base management system, wherein an application program 21 requests of a data base management system 22 certain data specified by some access keys (not shown in the FIGS.). A data file device 24 stores the records and the virtual records. The data base management system 22 carries out the access trials, as explained with regard to FIGS. 4, 5 and 6, via an address control 23, which selects a desired one of several linkage addresses.

Figure 7B:
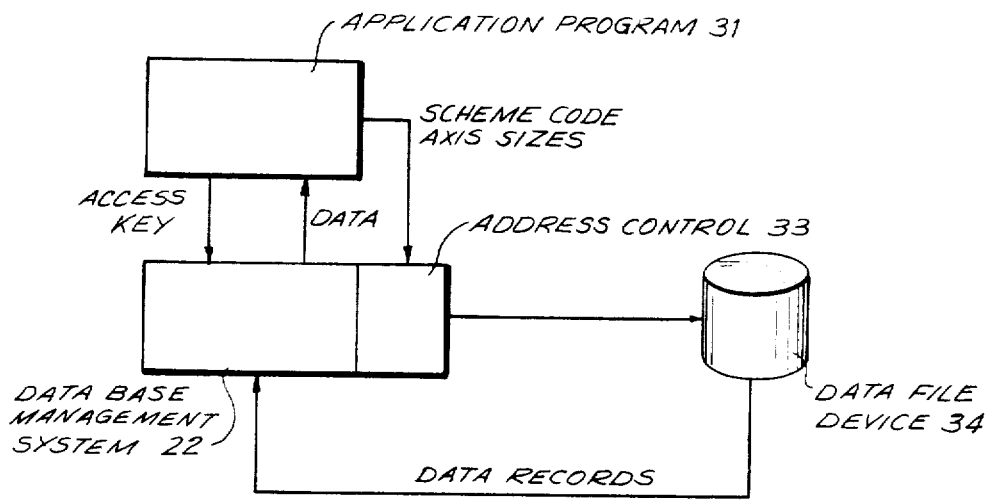
FIG. 7B is a block diagram of an embodiment of the data base system of the invention.

FIG. 7B shows the concept of the present invention, wherein an application program 31 designates scheme information prior to a request for accessing. Only the intrinsically necessary records are stored with one-dimensional addresses in a data file device 34 of FIG. 7B. The virtual records are not stored in the data file device 34. An address control 33 of FIG. 7B pretends to access the virtual records when it is designated the virtual set. The data base management system 22 is the same in FIGS. 7A and 7B.

Figure 10A:
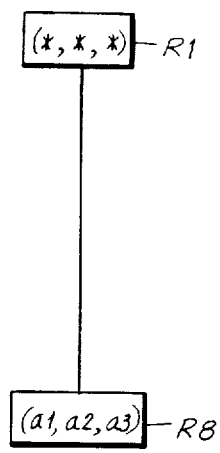
FIGS. 10A and 10B show a concept of imaginary sets and imaginary records of the data processing system of the invention.
Figure 10B:
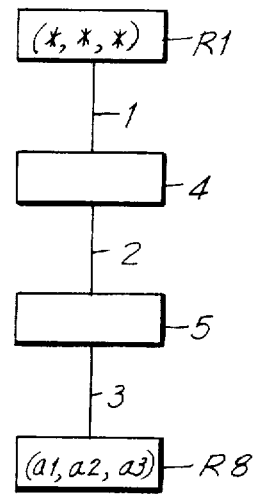

The scheme information includes a scheme code and coordinate axis sizes. The scheme code identifies the hierarchical structure of FIG. 4, FIG. 5, or FIG. 6. Since the address control 33 is designated the scheme information, it provides imaginarily the appropriate virtual records 4, 5 and virtual sets 1, 2, 3, as shown in FIG. 10B, while only the records R1 and R8, as shown in FIG. 10A, are actually stored in the data file device 34.

Figure 8A:
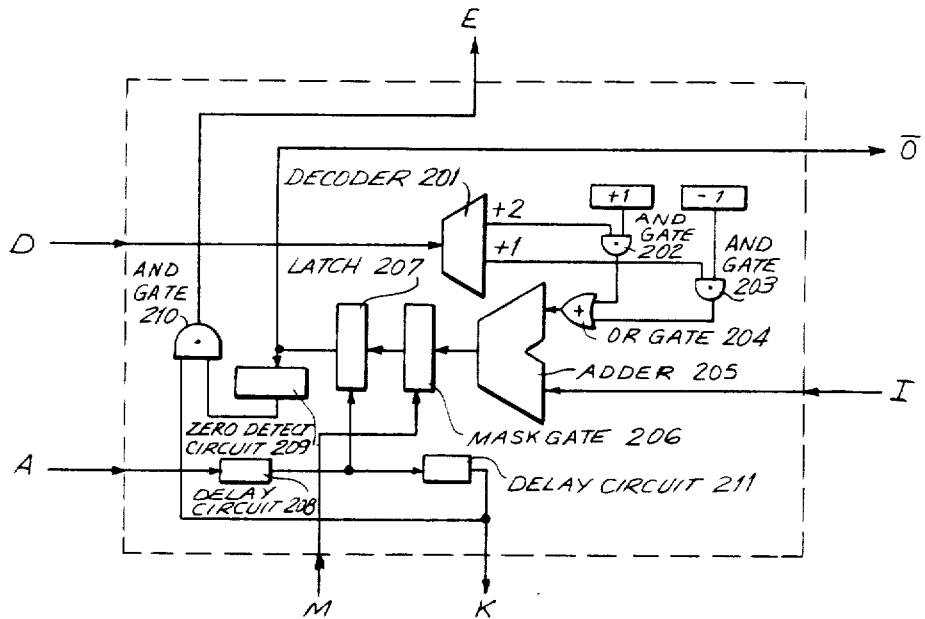
FIG. 8A is a block diagram of an embodiment of an arithmetic unit AU.
Figure 8B:
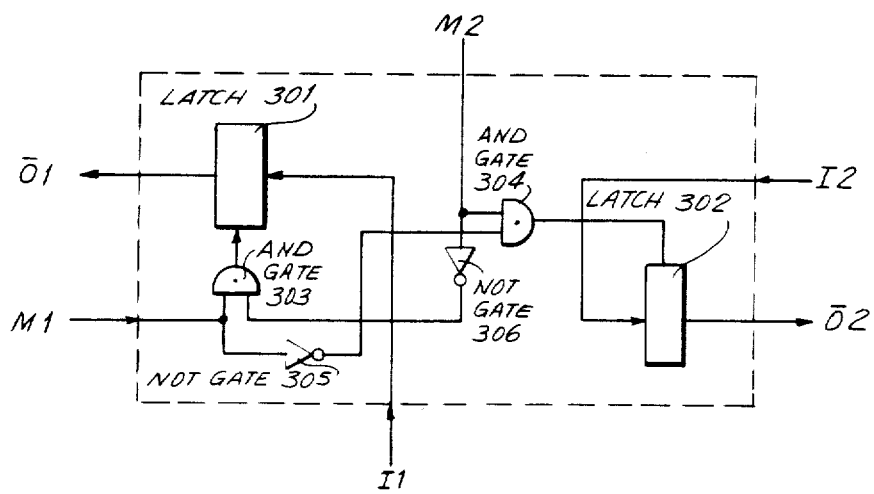
FIG. 8B is a block diagram of an embodiment of a bypass gate unit BG.
Figure 8E:
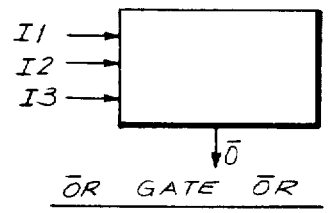
FIG. 8E is a block diagram of an $\overline{OR}$ gate $\overline{OR}$.
Figure 8H:
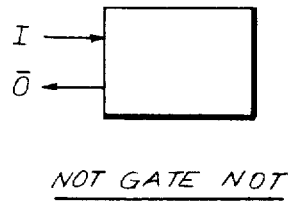
FIG. 8H is a block diagram of a NOT gate NOT.
Figure 8I:
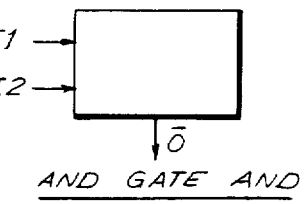
FIG. 8I is a block diagram of an AND gate.
Figure 8F:
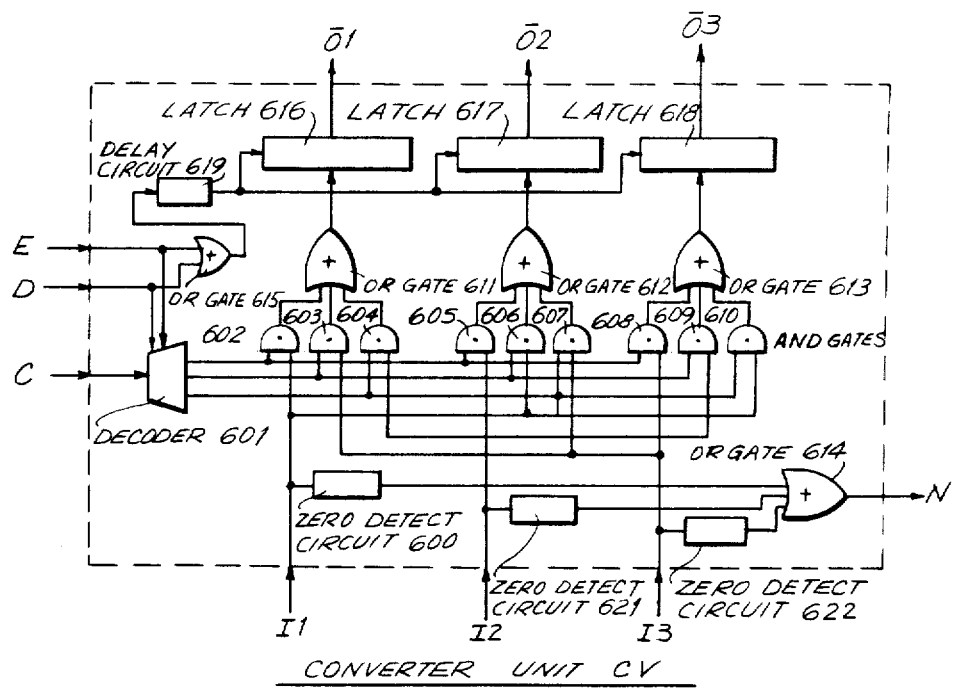
FIG. 8F is a block diagram of an embodiment of a converter unit CV.
Figure 8G:
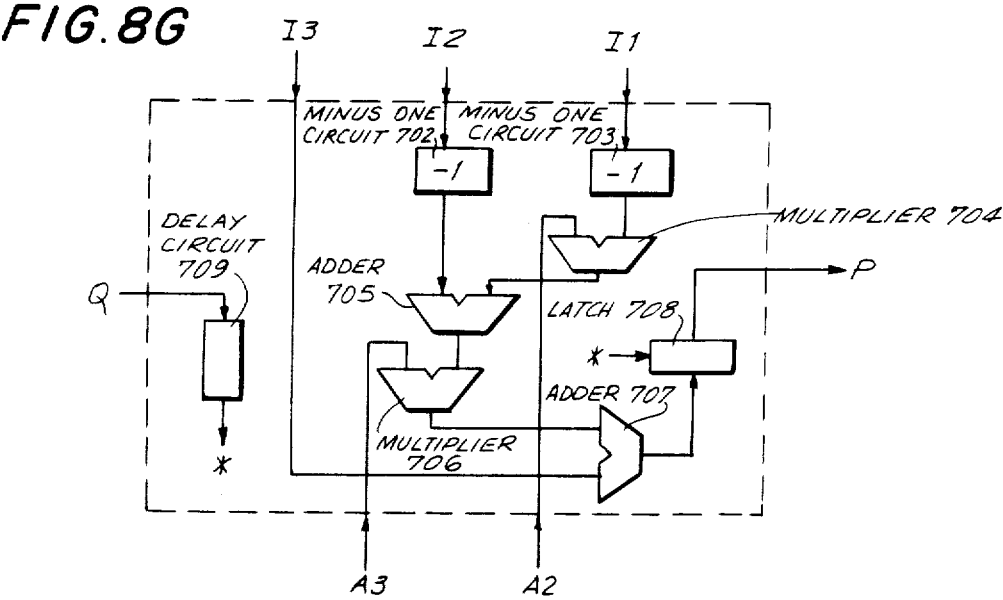
FIG. 8G is a block diagram of an embodiment of a linear expander unit LE.
Figure 8J:
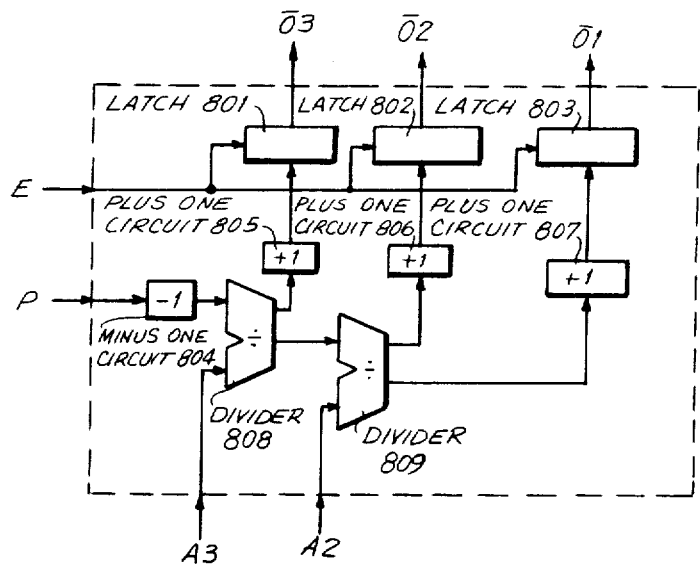
FIG. 8J is a block diagram of an embodiment of a compose matrix unit CM.
Figure 9:
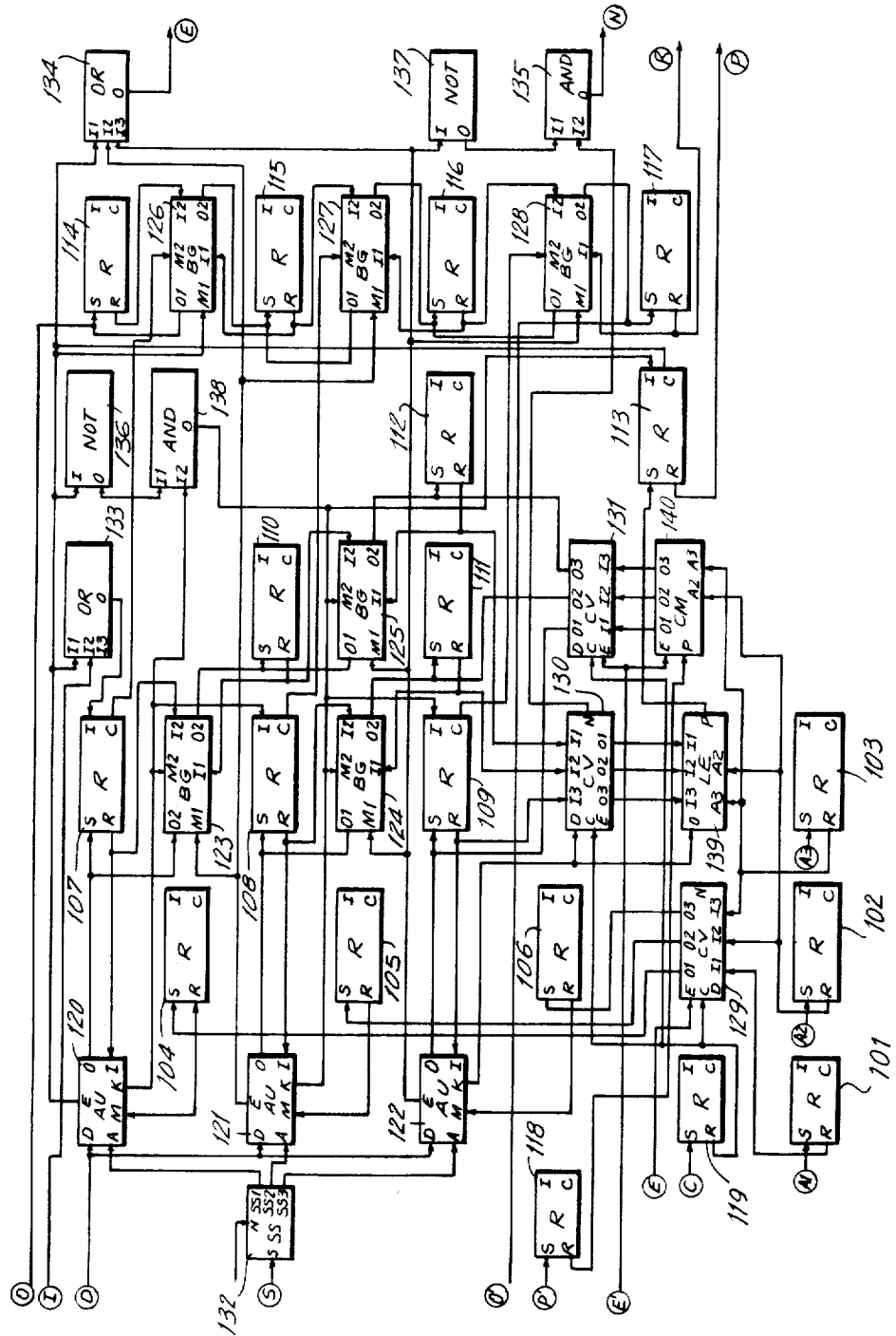
FIG. 9 is a block diagram of an embodiment of the data processing system of the invention.

FIG. 9 shows a detailed embodiment of the address control 33 of FIG. 7B, and FIGS. 8A to 8J show the internal circuits of the element units of FIG. 9.

FIG. 8A is a block diagram of an arithmetic unit AU. When a pulse is supplied to a terminal A, the arithmetic unit performs the following arithmetic operations for inputs I, D, M and outputs the result to a terminal $\overline{O}$.

$$\overline{O} = [I + (-1)^D] \bmod (M+1)$$

wherein I and M are desired integers and D is +1 or +2. The arithmetic unit therefore provides a decrement of 1 to I when D = +1 and provides an increment of 1 to I when D = +2. [] mod (M+1) indicates that operation with a modulus (M+1) is to be performed. The result of operation with a modulus (M+1) is expressed by its residue or remainder being divided by (M+1).

When operation is completed, a pulse is produced at a terminal K. When the output $\bar{O}$ is "O", a pulse is provided as an output at a terminal E.

In FIG. 8A, a decoder 201 decodes the input D and has two outputs connected to an AND gate 202 and an AND gate 203, respectively. The value +1 is supplied to the input of the AND gate 202 and the value −1 is supplied to the input of the AND gate 203. The outputs of the AND gates 202 and 203 are connected to an OR gate 204. The output of the OR gate 204 and the input I are added by an adder 205. The output of the adder 205 is connected to an input of a mask gate 206, which masks the upper bits of the output of said adder. Thus, for example, only lower two bits of the output of the adder 205 will pass through the mask gate 206 and the remaining upper bits will be inhibited when M=4. A limitation of FIG. 8A is that the value M can be $2^i$ and cannot be between $2^i$ and $2^{i+1}$, where i is a desired integer.

The output of the mask gate 206 is connected to an input of a latch 207 which is enabled by the pulse of the input A via a delay circuit 208. The output of the latch 207 is connected to the output $\bar{O}$ and to the input of a zero detect circuit 209. The output of the zero detect circuit 209 is connected to an input of an AND gate 210. The output of the AND gate 210 is connected to the output E and provides a pulse when the output $\bar{O}$ equals zero and a pulse is provided to the output K via a delay circuit 211.

The delay time of the delay circuit 208 is selected to satisfy the operation time of the decoder 201, the gates 202 to 204, the adder 205, and the mask gate 206. The delay time of the delay circuit 211 is selected to satisfy the latching time of the latch 207.

D, $\bar{O}$, I and M are multi-bit signals, while A, K and E are single-bit signals.

FIG. 8B is a block diagram of an embodiment of a bypass gate unit BG, which operates as follows, only when a pulse is applied to either of its terminals M1 and M2. When a pulse is applied to the terminal M1 of the gate unit BG, the signal received at input terminal I1 is transmitted to output terminal $\bar{O}1$. When a pulse is applied to the terminal M2 of the gate unit BG, the signal received at input terminal I2 is transmitted to output terminal $\bar{O}2$.

The bypass gate unit BG of FIG. 8B includes latches 301 and 302, AND gates 303 and 304, and NOT gates 305 and 306. I1, $\bar{O}I$, I2 and $\bar{O}2$ are multi-bit signals and M1 and M2 are single-bit signals.

FIG. 8C is a block diagram of an embodiment of a register unit R which stores a signal received at a terminal S and reads its contents out at a terminal R. When a pulse is applied to a terminal I, the contents of the register may be reset. When the contents of the register vary from "O" to a value other than "O", a pulse is output at a terminal C.

The register unit R of FIG. 8C comprises a conventional register circuit 401 having a parallel input terminal connected to the input terminal S, a parallel output terminal connected to the output terminal R and a reset terminal connected to the input terminal I. A zero detect circuit 402 sets a flip-flop 403 when the output R equals zero. A non-zero detect circuit 404 resets the flip-flop 403 via delay circuit 406 when the output R is not zero. An AND gate 405 is supplied with the output of the flip-flop 403 and the output of the non-zero detect circuit 404. S and R are multi-bit signals and I and C are single-bit signals.

FIG. 8D is a block diagram of an embodiment of a set selection unit SS which transmits a pulse applied to a terminal N to any one of terminals S1, S2 and S3 in accordance with a code input at a terminal S. The set selection unit SS of FIG. 8D comprises a decoder 501 and AND gates 502, 503 and 504. S is a multi-bit signal and N, S1, S2 and S3 are single-bit signals.

FIG. 8E is a block diagram of an OR gate unit $\overline{OR}$. When an input pulse is supplied to any one of terminals I1, I2 and I3, a pulse is output at terminal $\bar{O}$.

FIG. 8F is a block diagram of an embodiment of a converter unit CV, which distributes signal inputs supplied to input terminals I1, I2 and I3 to output terminals $\bar{O}1$, $\bar{O}2$ and $\bar{O}3$ in accordance with an input supplied to terminal C when a pulse is provided at terminal E. More particularly, the input and output terminals of the converter unit are connected, for example, I1 to $\bar{O}1$, I2 to $\bar{O}2$ and I3 to $\bar{O}3$ when a specific value is applied to the terminal C, and are connected, for example, I1 to $\bar{O}2$, I2 to $\bar{O}3$ and and I3 to $\bar{O}1$ when a different value is applied to the terminal C. When a terminal D is driven, an inverted replacement is provided. The converter unit CV is operated with a delay of one cycle from the driving pulse. When "O" is applied to any of the input terminals I1, I2 and I3, a terminal N is driven. I1 to I3, $\bar{O}1$ to $\bar{O}3$ and C are multi-bit signals and E and N are single-bit signals.

The converter unit CV of FIG. 8F includes a decoder 601, AND gates 602 to 610, $\overline{OR}$ gates 611 to 615, latches 616 to 618, a delay circuit 619 for a one cycle delay and zero detect circuits 620 to 622. When the input C equals zero, for example, the decoder 601 drives its output line L1, and accordingly the input terminals I1, I2 and I3 are connected to the $\overline{OR}$ gates 611, 612 and 613 via the AND gates 602, 605 and 608, respectively.

Similarly, when the input C equals one, for example, the decoder 601 drives its output line L2, and accordingly the input terminals I1, I2 and I3 are connected to the $\overline{OR}$ gates 611, 612 and 613 via the AND gates 603, 606 and 609, respectively. Furthermore, when the input C equals two, for example, the decoder 601 drives its output line L3, and accordingly the input terminals I1, I2 and I3 are connected to the $\overline{OR}$ gates 611, 612 and 613 via the AND gates 604, 607 and 610, respectively.

The outputs of the $\overline{OR}$ gates 611, 612 and 613 are latched in the latches 616, 617 or 618 at the timing of the pulse from the delay circuit 619 and are outputed to the output terminals $\bar{O}1$, $\bar{O}2$ and $\bar{O}3$, respectively. When any of the zero detect circuits 620, 621 and 622 detects that the input at the terminals I1, I2 or I3 equals zero, the terminal N is driven by the $\overline{OR}$ gate 614.

FIG. 8G is a block diagram of an embodiment of a linear expander unit LE, which is enabled when a pulse is supplied to a terminal Q, and issues an output, two cycles later, expressed by the following equation at terminal P, in accordance with inputs from terminals I1 to I3, A2 and A3.

$$P = [(I1-1)A2 + (I2-1)]A3 + I3$$

The linear expander unit LE of FIG. 8G comprises minusone circuits 702 and 703, multiplier circuits 704 and 706, adder circuits 705 and 707, a latch 708 and a delay circuit 709 for a two cycle delay.

FIG. 8H is a block diagram of a NOT gate and FIG. 8I is a block diagram of an AND gate. In FIGS. 8H and 8I, I, I1 and I2 are input terminals and single-bit signals and $\bar{O}$ is an output terminal and a single-bit signal.

FIG. 8J is a block diagram of an embodiment of a compose matrix unit CM, which provides inverted conversion of the linear expander unit LE. More particularly, when a pulse is applied to a terminal E, the compose matrix unit provides an arithmetic operation in accordance with the signals at input terminals P, A2 and A3, and an output is provided at output terminals $\overline{O}1$, $\overline{O}2$ and $\overline{O}3$.

$$\overline{O}3 = [P - 1] \bmod A3 + 1$$

$$\overline{O}2 = \left[\frac{P-1}{A3}\right] \bmod A2 + 1$$

$$\overline{O}1 = \left[\frac{P-1}{A3 \cdot A2}\right] \bmod 1 + 1$$

wherein [] mod Ai is the residue or remainder of the contents in the blanket divided by Ai.

The compose matrix unit CM of FIG. 8J includes latches 801 to 803, a minus-one circuit 804, plus-one circuits 805 to 807, and dividers 808 and 809. $\overline{O}1$ to $\overline{O}3$, A2, A3 and P are multi-bit signals and E is a single-bit signal. The minus-one circuit 804 provides (P−1) which is then divided by A3 in the divider 808. The remainder of the division is added by one at the plus-one circuit 805 and fed to the latch 801. The quotient of the division is further divided by A2 in the divider 809. The remainder of the division performed by the divider 809 is added by one at the plus-one circuit 806 and fed to the latch 802. The quotient from the divider 809 is added by one at the plus-one circuit 807 and fed to the latch 803. The latches 801 to 803 latch the signals fed thereto when a pulse is provided at the terminal E.

In FIG. 9, 101 to 119 are register units R, as shown in FIG. 8C, 120 to 122 are arithmetic units AU as shown in FIG. 8A, 123 to 128 are bypass gates BG, as shown in FIG. 8B, 129 to 131 are converter units CV, as shown in FIG. 8F, 132 is a set selection unit SS, as shown in FIG. 8D, 133 and 134 are OR gates OR, as shown in FIG. 8E, 136 and 137 are NOT circuits NOT, as shown in FIG. 8H, 135 and 138 are AND gates AND, as shown in FIG. 8I, 139 is a linear expander LE, as shown in FIG. 8G and 140 is a compose matrix unit CM, as shown in FIG. 8J.

The registers 101, 102 and 103 store the sizes A1, A2 and A3, respectively, of the three coordinates a1, a2 and a3, respectively. In FIG. 1, specifically, A1=2, A2=2, A3=3. The register 119 stores the scheme code C, which designates the desired hierarchical structure. The converter 129 replaces the size information A1 to A3 received from the registers 101 to 103, respectively, and distributes such information to the registers 104 to 106, respectively, in accordance with the code C provided by the register 119. When the scheme in FIG. 4 is designated, for example, A2 is stored in the register 104, A3 is stored in the register 105 and A1 is stored in the register 106.

The register 107 is previously reset via the OR gate 133 and the register 114 simultaneously stores the storing location information of the owner record R1. With such preparation, matrix type data may be accessed under the optimum scheme in an existing data base management system by sequentially designating the set selection signal S and direction designation signal D.

Access may be attempted, for example, to the #9 record (213) in the scheme of FIG. 4. For this purpose, the code designating the first set SS1 is fed to the set selection unit 132 as the code S in order to operate the arithmetic unit 120. The contents of the register 107 are incremented by the modulus on the basis of the contents of the register 104. At such time, D is specified as +2, indicating counterclockwise rotation, as shown in FIG. 4. When the process is completed, a pulse is output at the terminal K of the arithmetic unit 120 and is fed to the terminal M2 of the bypass gate 123 and to the terminal I of the register 108. The contents of the register 107 are thereby shifted to the register 110 via the bypass gate 123 and the register 108 is reset. This state corresponds to the state where access is to the virtual record (\*, 1, \*) in FIG. 4. However, there is no actual data corresponding to the record (\*, 1, \*) in the file 33 and access to the file 33 is not carried out.

The code designating the second set SS2 is successively fed to the set selection unit 132 as the code S in order to operate the arithmetic unit 121. The contents of the register 108 are thus incremented by the modulus on the basis of the contents of the register 105. At such time, D= +2. When this process is completed, a pulse is output at the terminal K of the arithmetic unit 121 and is then transmitted to the terminal M2 of each of the bypass gates 124 and 125, and to the terminal I of the register 109. The contents of the register 108 are thereby shifted to the register 111, the contents of the register 110 are shifted to the register 112, and the register 109 is reset. This state corresponds to the state where access is made to the virtual record (\*, 1, 1) in FIG. 4.

The user or the application program 31 of this data is previously aware that the address in the second set SS2 must be made "3" in order to access the #9 record (213). The contents of the register 108 are therefore incremented by designating SS2 again. The result of such processing corresponds to accessing the virtual record (\*, 1, 2) in FIG. 4. When the contents of the register 108 become "3" by repeated designation of SS2, they correspond to accessing the virtual record (\*, 1, 3) in FIG. 4.

The code for designating the third set SS3 is then fed to the set selection unit 132 as the code S in order to operate the arithmetic unit 122. The contents of the register 109 are thus incremented by the modulus on the basis of the contents of the register 106. When the process is completed, a pulse is provided at the terminal K of the arithmetic unit 122, and is fed to the terminal E of the converter 130 and to the terminal Q of the linear expander 139. The converter 130 transfers the signals I1, I2 and I3 received from the registers 109, 111 and 112 to its outputs 01, 02 and 03, in accordance with the scheme designation code C received from the register 119. The linear expander 139 provides the aforedescribed process. In the current state, access is to the #3 record (113) in FIG. 4, for example. In other words, I1=1, I2=1 and I3=3 as the inputs of the linear expander 139, and A1=2, A2=2 and A3=3. Therefore, $$P = [(I1 - 1)A2 + (I2 - 1)]A3 + I3$$
$$= [0 \times 2 + 0] \times 3 + 3$$
$$= 3$$

More particularly, the one-dimensional address #3 may be obtained from the three-dimensional coordinate (113).

If the user desires the data of the #9 record (213), the contents of the register 109 are incremented by designating the third set SS3 again. As a result, I1=2, I2=1 and I3=3, in the linear expander 139, and the one-dimensional address #9 may be obtained in the register 113 by applying such data to the foregoing equation.

Since the #9 record is the desired record, the actual file 34 is accessed on the basis of the contents of the register 113 (P) and the contents of the register 117 (R). When the contents of the registers 107, 108 and 109 are incremented from "0", pulses provided at the terminal C of each register are transmitted to the bypass gates 126, 127 and 128. The owner record location information which is first set in the register 114 is therefore shifted to the register 117 via the registers 115 and 116.

When an address in a set of a specific set SSi is incremented, the address in a set of a lower set SSi+1 is reset. More particularly, when the content of the register 107 for the set SS1, for example, is incremented, a pulse from the terminal K of the arithmetic unit 120 is transmitted to the terminal I of the register 108 and its contents become zero, as hereinbefore mentioned.

Furthermore, if the address exceeds the maximum address in the set when each of the arithmetic units 120 to 122 is incremented, the output becomes "0" and a pulse is provided at the terminal E. This pulse is applied to the terminal M1 of the related bypass gate and to the OR gate 134. The pulse received from the terminal E of the arithmetic unit 121 is fed to the bypass gates 123 and 127, for example, and said gates operate so that the contents of the register 110 are returned to the register 107 and the contents of the register 116 are returned to the register 115. This function is required for connecting the data group involved to the other owner record, as required, as hereinafter explained.

An output of the OR gate 134 functions as an end signal, indicating that incrementation of any set is completed. Furthermore, when the arithmetic unit 120 is incremented under the condition that a pulse is not output at the terminal E of said arithmetic unit, a pulse at the terminal K of said arithmetic unit is transmitted via the AND gate 138 to the terminal M2 of the bypass gates 124 and 125 and the reset terminal I of the register 113 via said AND gate.

It is possible to designate a specific member record of the other owner record in a known data base management system under the condition that a specific member record is designated under a specific owner record. The location information of the new owner record 0' may be set in the register 117. The one-dimensional address P' of a new member record may be set in the register 118. The contents of the register 118 are converted to a three-dimensional coordinate by the compose matrix unit 140. Each coordinate value of such three-dimensional coordinate is replaced by the converter 131 in accordance with the scheme designation code in the register 119 and set in each register 109, 111 and 112.

When the result of the incrementation of the third set SS3 in the arithmetic unit 122 returns to zero, a pulse is transmitted to the terminal M1 of the bypass gates 124 and 125, as hereinbefore explained, and the contents of the registers 111 and 112 are shifted to the registers 108 and 110. Incrementation of the second set SS2 in this manner is possible in the new owner record.

Furthermore, when the converter unit 130 detects that any of the inputs I1 to I3 is zero, a pulse is provided at its terminal N and fed to the terminal I2 of the AND gate 135. When the contents of any of the registers 109, 111 and 112 becomes zero, therefore, under the condition that a pulse is not output at the terminal E of the arithmetic unit 122, a signal N may be output at the terminal $\overline{O}$ of the AND gate 135. The signal N is an error signal.

The equations of the operations in the linear expander unit LE and the compose matrix unit CM may be generalized, as follows, for n-dimensional matrix data, wherein n is a desired integer. In the linear expander unit LE, $$P = I(1-1)A2 \cdot A3 \cdot A4 \ldots A(n-1)An + \\ I(2-1)A3 \cdot A4 \ldots A(n-1)An + \\ [I(n-2)-1]A(n-1)An + \\ [I(n-1)-1]An + In$$

and in the compose matrix unit CM, $$\overline{O}n = [P-1] \bmod An + 1$$

$$\overline{O}(n-1) = \left[\frac{P-1}{An}\right] \bmod A(n-1) + 1$$

$$\overline{O}(n-2) = \left[\frac{P-1}{An \cdot A(n-1)}\right] \bmod A(n-2) + 1$$

$$\overline{O}2 = \left[\frac{P-1}{An \cdot A(n-1) \ldots A3}\right] \bmod A2 + 1$$

$$\overline{O}1 = \left[\frac{P-1}{An \cdot A(n-1) \ldots A3 \cdot A2}\right] \bmod 1 + 1$$

More generally expressed, $$\overline{O}i = \left[\frac{P-1}{An \cdot A(n-1) \ldots A(i+1)}\right] \bmod Ai + 1$$

where $i = 1 \sim n$ and $Ai = 1$.

While the invention has been described by means of a specific example and in a specific embodiment, I do not wish to be limited thereto, for obvious modifications will occur to those skilled in the art without departing from the spirit and scope of the invention.

I claim:

1. A data processing system for data base management comprising
   file means for storing n-dimensional matrix type data on tha basis of one-dimensional address information, said one-dimensional address information having a value equal to (a1−1)A2A3 ... An+(a2−1)A3A4 ... An+ ...
   +(a (n−1)−1)An+an, wherein a1, a2 ... an is the n-dimensional coordinate and A1, A2 ... An is the coordinate axis;
   n-coordinate axes for respectively storing the maximum value of each coordinate axis of an n-dimensional coordinate;
   scheme code storage means for storing a code designating any n-hierarchical scheme wherein each of n hierarchies is selected as desired from n coordinates, said n-hierarchical scheme being a single scheme having n hierarchies;
   n address storage means, each corresponding to a hierarchy of a specific n-hierarchical scheme and each for storing an address indicating an ordinal number in a specific set in the corresponding hierarchy, n being an integer at least equal to 2;

selecting means connected to said address storage means for selecting a desired one of said address storage means and updating the contents thereof;

updating means connected to said selecting means for updating the contents of the selected address storage means; and calculating means including a converter means including a converter means, said converter means connected to said n-coordinate axes, said scheme code storage means, said address storage means and said selecting means for calculating the one-dimensional address from the contents of said address storage means, the contents of said scheme code storage means and the contents of said n-coordinate axes, said file means being connected to said calculating means and being accessed by the one-dimensional address output from said calculating means, said converter means providing correspondence between the contents of said selected one of said address storage means and said n-dimensional coordinate in accordance with the contents of said scheme code storage means said converter means including a decoder, responsive to input scheme code signals, for providing different outputs of said converter means for the same inputs from said n-coordinate-axes, said converter means providing an output, and linear expander means for executing operation of said one-dimensional address information value in accordance with the output of said converter means and the contents of said n-coordinate axes, said linear expander means connected to said n-coordinate axes, said selecting means, and said converter means.

* * * * *

UNITED STATES PATENT AND TRADEMARK OFFICE
CERTIFICATE OF CORRECTION

PATENT NO. : 4,555,771
DATED : November 26, 1985
INVENTOR(S) : Katsumi Hayashi

It is certified that error appears in the above—identified patent and that said Letters Patent are hereby corrected as shown below:

Title page, after line [22] insert the following lines:

[30]     Foreign Application Priority Data

Aug. 31, 1978   [JP]    Japan ................ 53-106491

Signed and Sealed this

Eighth    Day of   April 1986

[SEAL]

Attest:

DONALD J. QUIGG

Attesting Officer        Commissioner of Patents and Trademarks